(12) United States Patent
Wang et al.

(10) Patent No.: US 10,386,677 B2
(45) Date of Patent: Aug. 20, 2019

(54) LIGHT EMITTING ASSEMBLY, LIGHT BAR, BACKLIGHT MODULE, DISPLAY MODULE AND TRANSPARENT DISPLAY MODULE

(71) Applicant: BOE Technology Group Co., Ltd., Beijing (CN)

(72) Inventors: Xin Wang, Beijing (CN); Fan Yang, Beijing (CN); Xuelin Han, Beijing (CN); Jianhua Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/790,324

(22) Filed: Oct. 23, 2017

(65) Prior Publication Data

US 2018/0284540 A1 Oct. 4, 2018

(30) Foreign Application Priority Data

Mar. 29, 2017 (CN) .......................... 2017 1 0201756

(51) Int. Cl.
*G09F 13/04* (2006.01)
*G02F 1/1335* (2006.01)
*G02F 1/1334* (2006.01)

(52) U.S. Cl.
CPC .. *G02F 1/133603* (2013.01); *G02F 1/133524* (2013.01); *G02F 1/133526* (2013.01);
(Continued)

(58) Field of Classification Search
CPC ......... G02F 1/133603; G02F 1/133553; G02F 1/133524; G02F 1/133526; G02F 1/133605
See application file for complete search history.

(56) References Cited

U.S. PATENT DOCUMENTS

2008/0225526 A1\* 9/2008 Yoshizawa ........ G02F 1/133611
362/294
2009/0140271 A1\* 6/2009 Sah .......................... F21V 31/04
257/88
(Continued)

FOREIGN PATENT DOCUMENTS

CN 101153990 A 4/2008
CN 103697376 A 4/2014
(Continued)

OTHER PUBLICATIONS

Office Action, including Search Report, for Chinese Patent Application No. 201710201756.6, dated Apr. 25, 2019, 16 pages.

*Primary Examiner* — Ali Alavi
(74) *Attorney, Agent, or Firm* — Westman, Champlin & Koehler, P.A.

(57) ABSTRACT

Embodiments of the present disclosure provide a light emitting assembly, a light bar, a backlight module, a display module and a transparent display module. The light emitting assembly includes a light emitting body and a reflector provided at a side of the light emitting body. The light emitting body is configured to emit first light and second light, the reflector includes a reflective surface for reflecting the first light emitted by the light emitting body to form a reflected light beam, the reflected light beam compensating the second light emitted by the light emitting body. A direction of the first light is deviated from a direction of the second light, and each of the first light and the second light has a non-zero angle range.

18 Claims, 10 Drawing Sheets

(52) U.S. Cl.
CPC .. *G02F 1/133553* (2013.01); *G02F 1/133615* (2013.01); *G02F 2001/13345* (2013.01)

(56) References Cited

U.S. PATENT DOCUMENTS

| | | | | |
|---|---|---|---|---|
| 2010/0188854 | A1* | 7/2010 | King | F21V 7/0025 362/296.04 |
| 2012/0039073 | A1* | 2/2012 | Tong | F21V 7/0008 362/231 |
| 2015/0021628 | A1* | 1/2015 | Medendorp, Jr. | H01L 33/0095 257/88 |

FOREIGN PATENT DOCUMENTS

| | | |
|---|---|---|
| CN | 103851415 A | 6/2014 |
| CN | 105987537 A | 10/2016 |
| CN | 106444160 A | 2/2017 |
| EP | 2 414 873 B1 | 5/2019 |

\* cited by examiner

LIGHT EMITTING ASSEMBLY, LIGHT BAR, BACKLIGHT MODULE, DISPLAY MODULE AND TRANSPARENT DISPLAY MODULE

CROSS-REFERENCE TO RELATED APPLICATION

This application claims the benefit of Chinese Patent Application No. 201710201756.6 filed on Mar. 29, 2017 in the State Intellectual Property Office of China, the disclosure of which is incorporated in entirety herein by reference.

BACKGROUND

Technical Field

Embodiments of the present disclosure relate to a field of optical technology or a field of display technology, and more particularly, to a light emitting assembly, a light bar, a backlight module, a display module and a transparent display module.

Description of the Related Art

As flat panel display devices, liquid crystal displays (LCDs) have been more and more widely used in the field of high-performance display due to its characteristics such as small size, low power consumption, no radiation and relatively low production cost.

As to the LCD, since liquid crystal itself cannot emit light, it is necessary to provide an external light source so as to achieve an image display by means of light transmission or reflection. In most LCDs, a backlight source is provided at a side of a display panel to achieve a normal display, and a light emitting diode (LED) is generally used as a light emitting body in the backlight source.

Taking a LED which has an angle range of light emission of generally 120° for example, since the angle range of light emission of this LED is constant, application of a light bar having the LED is limited if it is used in the backlight source. For example, for some special display devices, it has certain requirement on the angle range of light emission of the LED in the backlight source. In the case of the angle range of light emission of the LED being 120°, since a critical light exit angle of light emitted by the LED is relatively larger and the display device cannot effectively utilize the light having such a large light exit angle, the whole display device has an extremely low light utilization ratio. Moreover, a problem of one side of the display device close to the LED being brighter and the other side of the display device away from the LED being darker occurs due to the angle range of light emission of the LED, thereby the display device has a non-uniform brightness. Therefore, in practical applications, it is necessary to select an LED having an appropriate light emission performance according to actual needs. However, most LEDs are of constant light emission, therefore it cannot meet various application needs.

SUMMARY

The embodiments of the present disclosure refer to the following technical solutions:

In an embodiment of the present disclosure, there is provided a light emitting assembly, comprising a light emitting body and a reflector provided at a side of the light emitting body, wherein the light emitting body is configured to emit first light and second light, the reflector comprises a reflective surface for reflecting the first light emitted by the light emitting body to form a reflected light beam, the reflected light beam compensating the second light emitted by the light emitting body, and wherein a direction of the first light is deviated from a direction of the second light, and each of the first light and the second light has a non-zero angle range.

According to an optional embodiment of the present disclosure, the reflected light beam is projected into an irradiation range of the second light.

According to an optional embodiment of the present disclosure, the angle range of the reflected light beam is smaller than the angle range of the second light.

According to an optional embodiment of the present disclosure, the reflective surface of the reflector is concave.

According to an optional embodiment of the present disclosure, the angle range of the reflected light beam is larger than the angle range of the second light.

According to an optional embodiment of the present disclosure, the reflective surface of the reflector is convex.

According to an optional embodiment of the present disclosure, the angle range of the reflected light beam is 80°.

According to an optional embodiment of the present disclosure, the light emitting body comprises two LEDs disposed opposite to each other, and the first light and the second light are emitted by the two LEDs, respectively.

According to an optional embodiment of the present disclosure, the reflector is detachably connected to the light emitting body.

According to an optional embodiment of the present disclosure, the light emitting assembly further comprises a lens located on at least one side of the light emitting body and located in a path of the reflected light beam.

In an embodiment of the present disclosure, there is further provided a light bar, comprising a bracket and a plurality of light emitting assemblies according to any one of the above embodiments, wherein the plurality of light emitting assemblies are uniformly mounted on the bracket.

According to an optional embodiment of the present disclosure, a lens is provided between two adjacent light emitting assemblies.

In an embodiment of the present disclosure, there is further provided a backlight module, comprising the light bar according to any one of the above embodiments and a light guide plate, wherein the light bar is located on a side surface of the light guide plate.

According to an optional embodiment of the present disclosure, the light guide plate is a liquid crystal panel.

In an embodiment of the present disclosure, there is further provided a display module, comprising the backlight module according to any one of the above embodiments.

In an embodiment of the present disclosure, there is further provided a transparent display module, comprising a transparent liquid crystal display panel and the light bar according to any one of the above embodiments, wherein the light bar is arranged on a side surface of the transparent liquid crystal display panel.

According to an optional embodiment of the present disclosure, a liquid crystal layer of the transparent liquid crystal display panel comprises liquid crystal molecules and functional monomers, and the functional monomers form a polymer network having variable degree of crosslinking under the driving of an electric field, and a light output ratio of the liquid crystal layer varies with the degree of crosslinking of the polymer network.

BRIEF DESCRIPTION OF THE DRAWINGS

In order to more clearly illustrate the technical solutions in the embodiments of the present disclosure or the related art, the following drawings, which are used in the description of the embodiments or the related art, will be briefly described. It will be apparent that the drawings mentioned in the following description merely represent some embodiments of the present disclosure, and other drawings may be obtained by those skilled in the art from these drawings without creative work.

DETAILED DESCRIPTION OF PREFERRED EMBODIMENTS

The technical solutions described in the embodiments of the present disclosure will be clearly and completely described below with reference to the accompanying drawings in the embodiments of the present disclosure. It will be apparent that the described embodiments are merely part of the present disclosure and do not represent all the embodiments. All other embodiments obtained by those skilled in the art based on the embodiments of the present disclosure without creative work fall within the scope of the present disclosure.

Embodiments of the present disclosure are intended to provide a reflector, a light emitting assembly, a light bar, a backlight module and a display module, which can provide a light emission having an appropriate light performance according to the actual needs.

Figure 1:
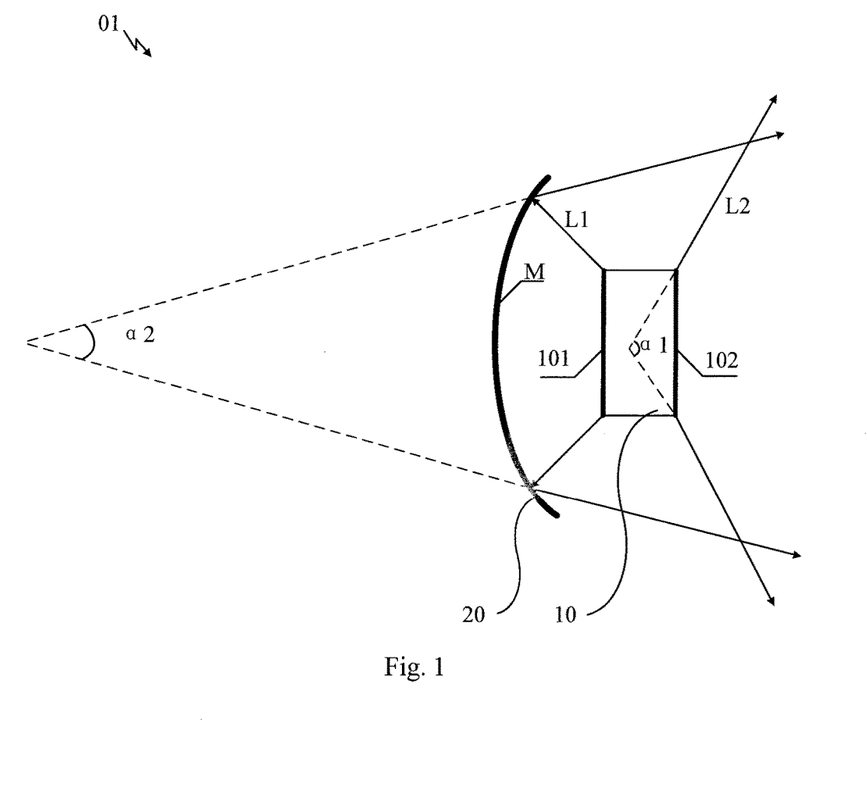
FIG. 1 is a schematic structural view of a light emitting assembly according to an embodiment of the present disclosure.

An embodiment of the present disclosure provides a reflector for use in a backlight source of a display device. As shown in FIG. 1, in a practical application, the reflector 20 is used in conjunction with a light emitting body 10 in the backlight source, first light L1 emitted from the backlight source of the display device is reflected by a reflective surface M of the reflector 20 so as to form a reflected light beam, and the reflected light beam compensates second light L2 emitted from the backlight source of the display device. The direction of the first light L1 is deviated from the direction of the second light L2, and the first light L1 and the second light L2 both have a non-zero light emission angle range.

Specifically, the reflector 20 and the light emitting body 10 form a light emitting assembly 01, and the reflector 20 is located at a side of the light emitting body 10. Both of the first light L1 and the second light L2 are emitted by the light emitting body 10, and a first light emitting surface 101 and a second light emitting surface 102 of the light emitting body 10 are used to emit the first light L1 and the second light L2, respectively. The following embodiments are described by taking specific applications of the reflector 20 in the light emitting assembly 01 as examples, in which the reflector 20 will be further discussed.

Figure 3:
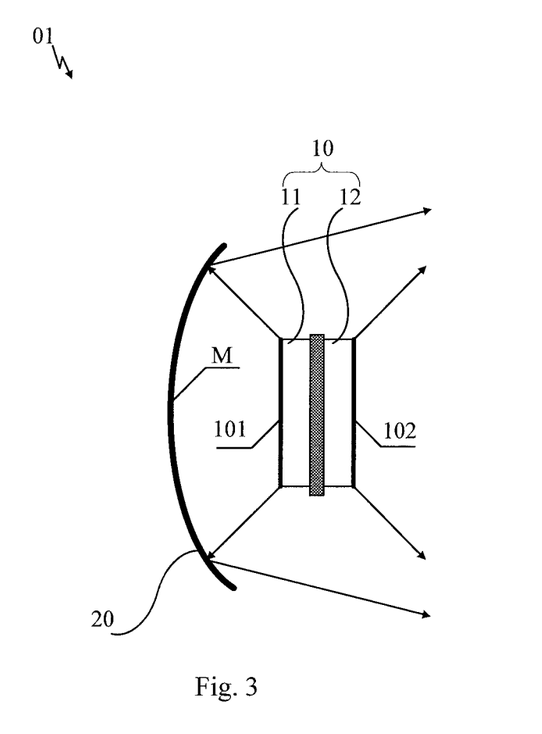
FIG. 3 is a schematic structural view of a light emitting assembly according to a further embodiment of the present disclosure.

Here, it should be noted that, the light emitting body 10 having the first light emitting surface 101 and the second light emitting surface 102 may be one LED having the first light emitting surface 101 and the second light emitting surface 102, or alternatively, as shown in FIG. 3, the light emitting body 10 includes two LEDs (11 and 12) disposed opposite to each other, and the first light emitting surface 101 and the second light emitting surface 102 are provided by the two LEDs (11 and 12) respectively, i.e., the first light emitting surface 101 and the second light emitting surface 102 are light emitting surfaces of the two LEDs respectively. It is apparent that the light emitting body may be any other light emitting devices, which is not limited in the present disclosure. In embodiments that will be explained hereinafter, the light emitting body 10 is a LED light emitting component.

In addition, in an optional embodiment of the present disclosure, the reflected light beam may be transmitted into an irradiation range of the second light L2, that is, at least a part of the reflected light beam is transmitted into the irradiation range of the second light L2, so that the reflected light beam and the second light L2 together form a mixed light beam so as to better enable the reflected light beam to effectively compensate the second light L2 and meet the requirements of the backlight source on light emission. The present disclosure will be further explained by the following embodiments, and in each of the embodiments a mixed beam is formed by the reflected light beam and second light L2.

In view of the above, the reflective surface of the reflector can reflect the first light in the backlight source of the display device to form a reflected light beam, and the reflected light beam can compensate the second light in the backlight source of the display device, thus, in practical applications, the reflector may be designed according to actual needs, so as to obtain a reflected light beam having specific optical characteristics such as an appropriate angle and an appropriate light emission amount. By compensating the second light in the backlight source of the display device with the reflected light beam having specific optical characteristics, a desired emitted light having an appropriate light performance may be achieved.

Specifically, an LED having a conventional light emission angle range of 120° will be taken as an example in the following description of specific arrangements of the reflector 20.

For example, as shown in FIG. 1, the reflective surface M of the reflector 20 may be concave. In this case, an upper limit value α2 (hereinafter referred to as "angle range of the reflected light beam") of the angle range of the reflected light beam generated by the concave reflective surface of the reflector is smaller than the light emission angle range α1 of the second light L2 emitted from the second light emitting surface 102, i.e., α2<α1, thereby the reflective light beam having a relatively small angle range (for example, 60° to 100°) compensates the second light L2 to meet actual needs of the LED light emitting assembly. Of course, in a practical application, a reflector cup may be selected as the reflector 20 having the concave reflective surface. Here, the included angle between boundaries may also be interpreted as an angle formed by the boundaries of the light beam.

Figure 2:
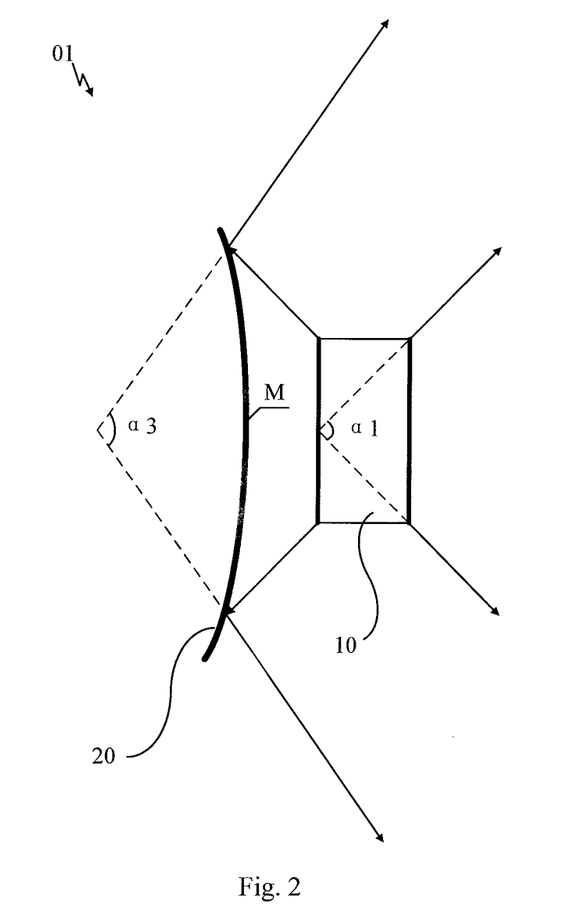
FIG. 2 is a schematic structural view of a light emitting assembly according to another embodiment of the present disclosure.

In another embodiment, as shown in FIG. 2, the reflective surface M of the reflector 20 may be convex. In this case, an angle range α3 of the reflected light beam generated by the convex reflective surface of the reflector is larger than the light emission angle range α1 of the second light L2 emitted from the second light emitting surface 102, i.e., α3>α1, thereby the reflective light beam having a relatively large angle range (for example, 130° to 150°) compensates the second light L2 to meet actual needs of the LED light emitting assembly.

Apparently, the reflective surface M of the reflector 20 may be an inclined plane, a groove structure, etc., and the present disclosure is not limited thereto. In a practical application, the reflector may be constructed or configured according to actual needs. Considering that the LED having a relatively small light emission angle can be more widely used in practical applications and no technical information about the LED having the relatively small light emission angle has been disclosed in related arts, the reflector 20 having the concave reflective surface shown in FIG. 1 may serve as a technical solution for achieving the relatively small light emission angle.

For example, in an application in the optical field, during light coupling while a liquid crystal layer is used as a waveguide layer, it is necessary to limit angle range of light emission of the LED located at a side of the liquid crystal layer to about 80°. However, actually, the angle range of light emission of the LED is generally 120°, therefore light utilization ratio of the entire liquid crystal waveguide layer is extremely low, and a problem of one side of the liquid crystal waveguide layer close to the LED being brighter and the other side of the liquid crystal waveguide layer away from the LED being darker occurs, thereby the liquid crystal waveguide layer has a non-uniform light emission brightness.

To solve the above-mentioned problems, the reflector 20 in the present disclosure may be used. By setting the curvature of the concave reflective surface M, the angle range of the reflected light beam can be precisely adjusted to 80°, so as to allow the reflected light beam having an angle range of 80° to compensate the second light L2 emitted from the second light emitting surface 102, to meet practical requirements of the liquid crystal waveguide layer on the angle range of the incident light.

It should be noted that, as for the above-described light emitting assembly 01, FIG. 1 is described taking the reflector 20 being located at the left side of the light emitting body 10 as an example. In this case, the reflector 20, the first light emitting surface 101 and the second light emitting surface 102 are successively arranged from left to right. Alternatively, the reflector 20 may be located at the right side of the light emitting body 10, and in such case, the reflector 20, the first light emitting surface 101 and the second light emitting surface 102 are successively arranged from right to left. The present disclosure is not limited thereto.

In addition, for example, in the case of the light emitting assembly 01 having been fixedly mounted, in order to facilitate adjustment of the angle range of light emission of the light emitting assembly 01 in practical applications, it is necessary to change the angle range of the light emitted from the light emitting assembly 01 or slightly adjust the angle range of light emission of the light emitting assembly 01. In an optional embodiment of the present disclosure, the reflector 20 is detachably connected to the light emitting body 10, such that the reflector 20 may be replaced by a different reflector having a different configuration to achieve the adjustment of the angle range of light emission of the light emitting assembly 01.

In order to further adjust the direction of the light beam reflected by the reflector 20, in an optional embodiment of the present disclosure, the light emitting assembly 01 further comprises a lens 30 located at least one lateral side of the light emitting body 10 and in the path of the reflected light. The lens may be, for example, a convergent lens or a divergent lens, so as to adjust the direction of the light beam reflected by the reflector 20 and passing through the lens 30, as shown in FIG. 4.

Figure 4:
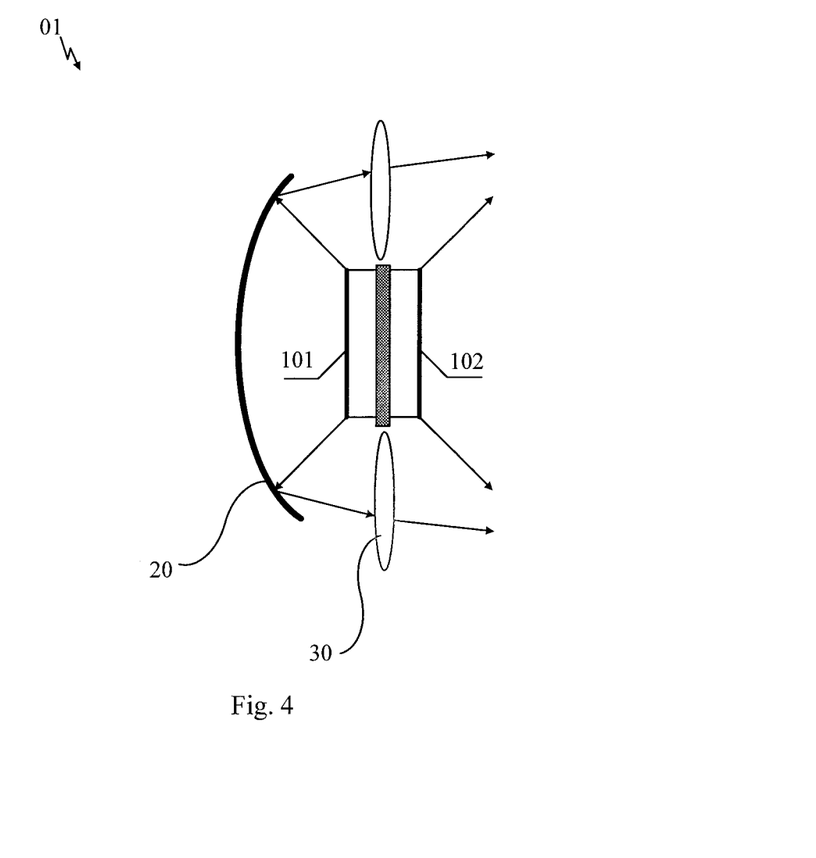
FIG. 4 is a schematic structural view of a light emitting assembly according to a still further embodiment of the present disclosure.

Of course, in an optional embodiment of the present disclosure, as shown in FIG. 4, each side of the light emitting body is provided with a lens 30, and an optical axis of the lens 30 is perpendicular to the first light emitting surface 101 and the second light emitting surface 102, so as to effectively adjust the reflected light beam at both sides of the second light emitting surface 102 by the lenses 30 and better meet the requirements on the light emitting assembly 01 in the application.

Figure 5:
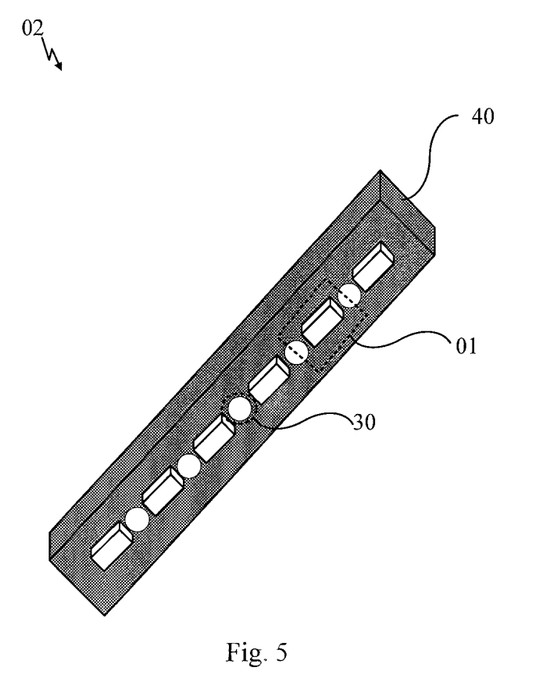
FIG. 5 is a schematic structural view of a light bar according to an embodiment of the present disclosure.
Figure 6:
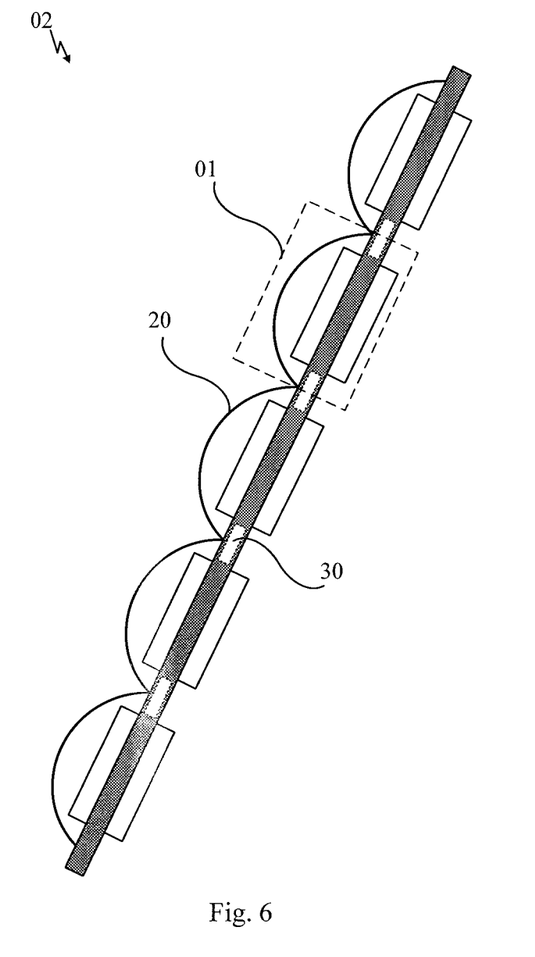
FIG. 6 is a schematic side structural view of the light bar shown in FIG. 5.

An embodiment of the present disclosure also provides a light bar, as shown in FIG. 5 and FIG. 6 (i.e., a side view of FIG. 5). The light bar 02 includes a bracket 40 and a plurality of light emitting assemblies 01 as described above, and the plurality of light emitting assemblies 01 are uniformly mounted on the bracket 40.

Since the light bar includes the light emitting assemblies 01 as described above, it has the structures and advantageous effects of the reflector 20 according to the above-described embodiments. Since the structures and advantageous effects of the reflector 20 have been described in detail in the above-described embodiments, they will not be repeated herein.

Of course, as shown in FIGS. 5 and 6, the lens 30 may be provided between two adjacent light emitting assemblies 01, so as to further adjust the direction of the reflected light beam. Further, one or more lenses (for example, a micro-lens array) may be provided between two adjacent light emitting assemblies 01, and the present disclosure is not limited thereto. As for the two light emitting assemblies 01 at two ends of the light bar 02 respectively, the side of the light emitting assembly close to the end of the light bar 02 may be provided with a lens or not. FIGS. 5 and 6 are described taking the light bar 02 provided with no lenses at the ends thereof as an example. In the practical application, it can be determined whether or not to provide the lens according to the actual needs, and the present disclosure is not limited thereto.

In addition, it should be noted that, the plurality of reflectors 20 corresponding to the plurality of light emitting assemblies 01 in the light bar 02 may be of a one-piece structure, so as to simplify an installation process and reduce an installation error, as shown in FIG. 6. Alternatively, each of the reflectors 20 is independently constructed and separately mounted, so as to individually adjust or replace each reflector 20 after the reflector s are mounted. The plurality of lenses 30 in the light bar 02 may be of a one-piece structure or may be independently constructed. Arrangement of the lenses can be determined according to the actual needs, and the present disclosure is not limited thereto.

Figure 7:
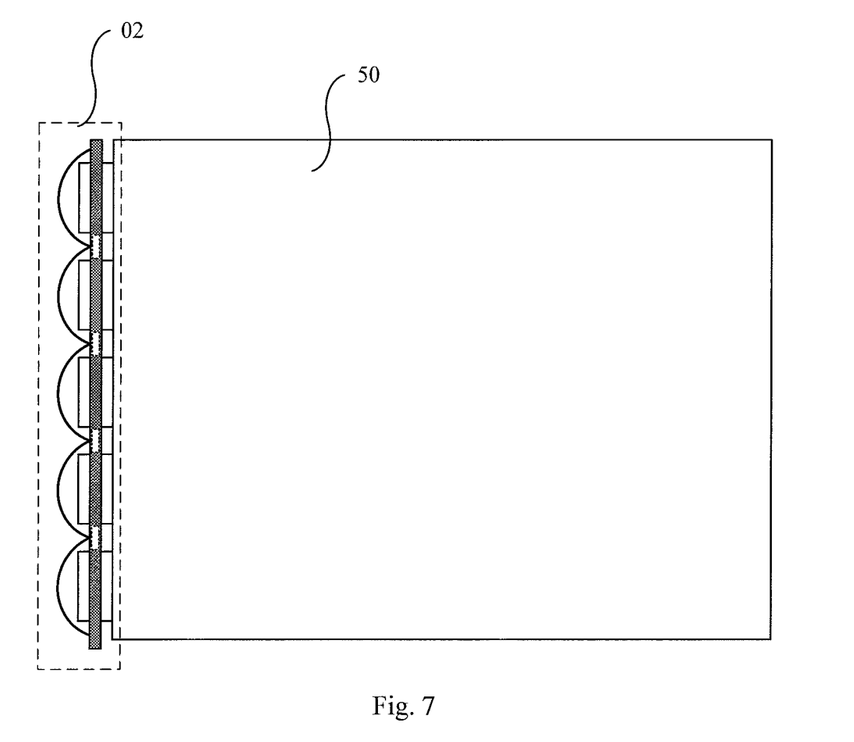
FIG. 7 is a schematic structural view of a backlight module according to an embodiment of the present disclosure.

An embodiment of the present disclosure also provides a backlight module, as shown in FIG. 7. The backlight module includes the above-described light bar 02 and a light guide plate 50, and the light bar 02 is located on a side surface of the light guide plate 50. Similarly, the backlight module also includes the reflector 20 as described above, therefore it has the structures and advantageous effects of the reflector 20 according to the above-described embodiments. Since the structures and advantageous effects of the reflector 20 have been described in detail in the above-described embodiments, they will not be repeated herein.

Firstly, it should be noted that, for the backlight module using the light bar 02 in the present disclosure, it is possible to meet the actual requirement of the backlight module by selecting the light emitting module 01 having an appropriate irritation angle, for example, the light guide plate 50 may be a liquid crystal panel. Optionally, a reflector 20 configured to provide a reflected light beam having an angle range of 80° may be selected, so as to achieve a maximum light utilization ratio for the backlight source.

On one hand, the above-described backlight module, in which the light emitting assembly 01 is arranged on the side surface of the liquid crystal panel, can be used as a novel backlight module to replace conventional backlight module. On the other hand, since a liquid crystal panel is used as the light guide plate in the backlight module, interlayer structures of the liquid crystal panel can be made of a transparent material, such that it can be better applied in the field of transparent displays.

Figure 8A:
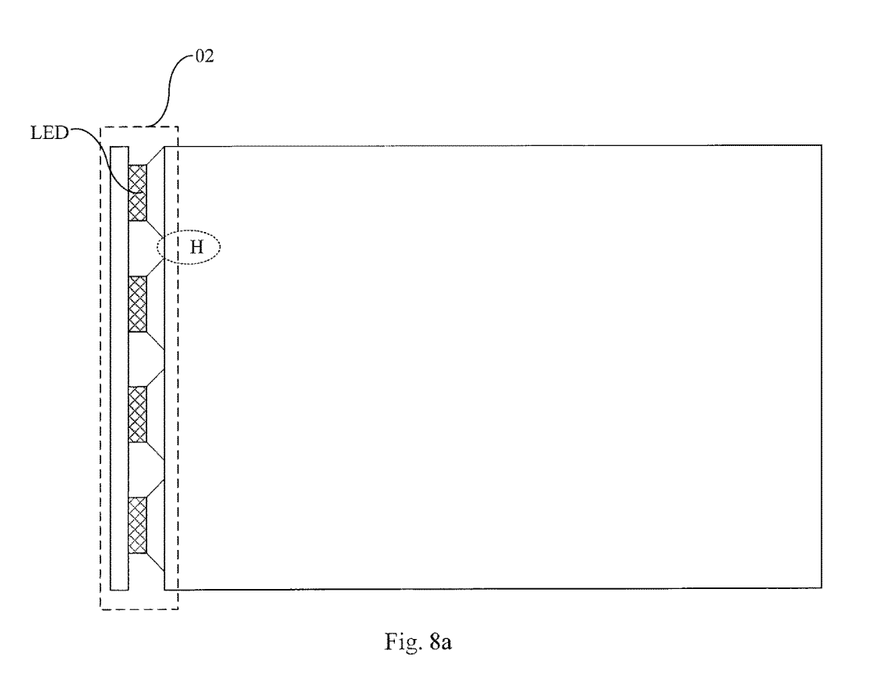
FIG. 8a is a schematic structural view of a backlight module in a related art.
Figure 8B:
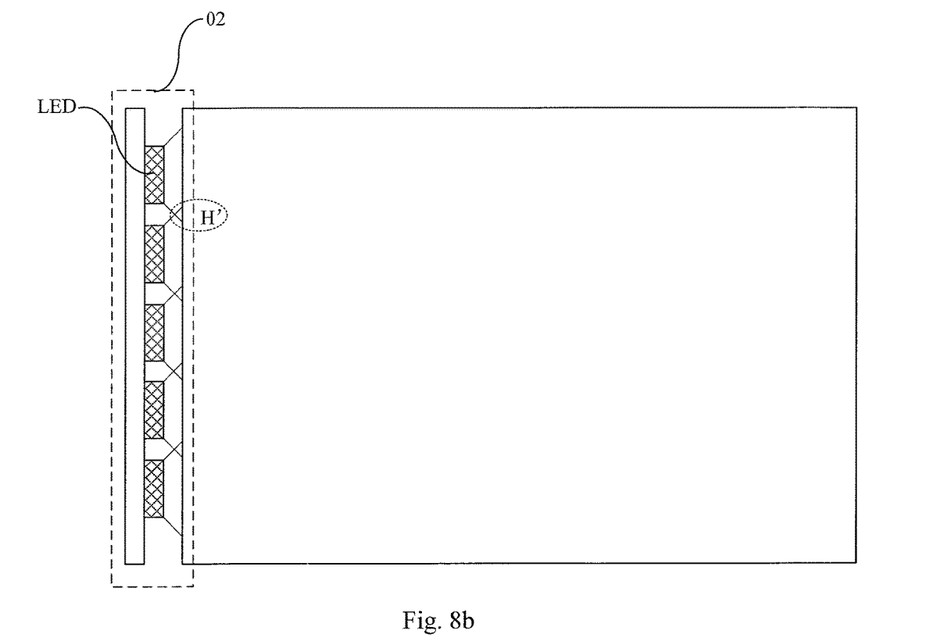
FIG. 8b is a schematic structural view of another backlight module in a related art.

Secondly, for the conventional backlight module, a non-uniform light emission of the backlight module may occur due to installation error during the installation of the LED in the light bar 02. For example, as shown in FIG. 8a, if a distance between two adjacent LEDs is too large, a dark area H that cannot be covered by light emitted by the two adjacent LEDs will be generated between the two adjacent LEDs; or, as shown in FIG. 8b, if the distance between the two adjacent LEDs is too small, a light overlapping area H' having a stronger brightness will be generated between the two adjacent LEDs, resulting in a bright spot. Either of the above two situations will result in a non-uniform brightness distribution of the backlight module.

In view of the above drawbacks, the light bar 02 in the present disclosure may be used, as shown in FIG. 7, in the case that the reflector 20 is detachably connected to the light emitting body 10 in the light emitting assembly 01 in the light bar 02, the angle range of light emission of the light emitting assembly 01 may be adjusted by replacing or adjusting the reflector 20, even if the light bar 02 has been fixedly mounted, such that problems of the dark area H that cannot be covered by light and the light overlapping area H' having a stronger brightness in the related art can be avoided.

An embodiment of the present disclosure also provides a display module comprising the above-described backlight module. The backlight module similarly includes the reflector 20 as described above, therefore it has the structures and advantageous effects of the reflector 20 according to the above-described embodiments. Since the structures and advantageous effects of the reflector 20 have been described in detail in the above-described embodiments, they will not be repeated herein.

Figure 9:
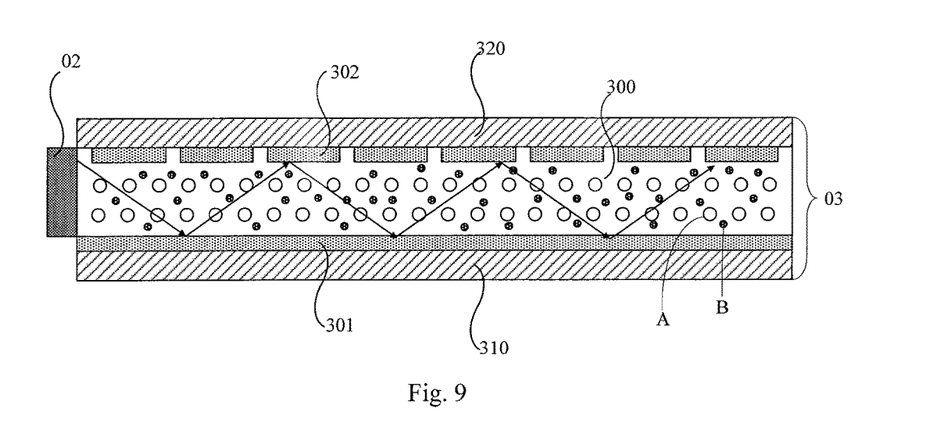
FIG. 9 is a schematic view of a display module according to an embodiment of the present disclosure in the case that no electric field is applied.

An embodiment of the present disclosure also provides a transparent display module as shown in FIG. 9. The transparent display module includes a transparent liquid crystal display panel 03 and a light bar 02 arranged on a side surface of the transparent liquid crystal display panel 03. The light bar 02 in the display module similarly includes the reflector 20 as described above, therefore it has the structures and advantageous effects of the reflector 20 according to the above-described embodiments. Since the structures and advantageous effects of the reflector 20 have been described in detail in the above-described embodiments, they will not be repeated herein.

It should be noted that, for the transparent liquid crystal display panel 03 in the transparent display module described above, the transparent liquid crystal display panel 03 functions as both of a display module and a backlight module, i.e., the backlight module and the display module are achieved by a one-piece structure. In contrast to the display module and the backlight module which are separately manufactured, the transparent display module is more compliant with a light and thin design concept of the display device.

Next, the transparent liquid crystal display panel 03 will be described in further detail.

As shown in FIG. 9, the transparent liquid crystal display panel 03 includes a first base substrate 310 and a second base substrate 320 disposed opposite to each other, a liquid crystal layer 300 disposed between the first base substrate 310 and the second base substrate 320, and a pixel electrode 302 and a common electrode 301 for driving the liquid crystal layer 300. The above-described light bar 02 is located on a side surface of the liquid crystal layer 300.

Herein, it should be noted that, specific arrangements of the pixel electrode 302 and the common electrode 301 for driving the liquid crystal layer 300 are not limited in the present disclosure. It is possible that the pixel electrode 302 and the common electrode 301 are respectively located at two sides of the liquid crystal layer 300, the common electrode 301 is planar and the pixel electrode 302 is strip-shaped, as shown in FIG. 9; alternatively, it is possible that the pixel electrode 302 and the common electrode 301 are located at the same side of the liquid crystal layer 300, the pixel electrode 302 is strip-shaped, the common electrode 301 is planar, and the pixel electrode 302 is located at a side of the common electrode 301 close to the liquid crystal layer 300; further alternatively, it is possible that the pixel electrode 302 and the common electrode 301 are located at the same side of the liquid crystal layer 300, and the pixel electrode 302 and the common electrode 301 are both strip-shaped electrodes spaced apart from each other. In practical applications, the pixel electrode 302 and the common electrode 301 may be arranged according to actual needs.

In addition, as shown in FIG. 9, the above-described liquid crystal layer 300 comprises liquid crystal molecules A and functional monomers B, and the functional monomers B form a polymer network C (see FIG. 10) having a variable degree of crosslinking under the driving of an electric field, and a light output ratio of the liquid crystal layer 300 varies with the degree of crosslinking of the polymer network C.

Herein, it should be noted that, in the above-described transparent liquid crystal display panel 03, it is not intended to specifically limit the liquid crystal molecules A in the above-described liquid crystal layer 300, they may be polymer stabilized liquid crystal molecules, or blue-phase liquid crystal molecules or any other liquid crystal molecules, as long as a gray scale display of the display device can be satisfied. Of course, in order to achieve a better transparency effect through the driving of the electric field, the polymer stabilized liquid crystal molecules are selected in an optional embodiment of the present disclosure.

In addition, in the case that the above-described display module is a transparent display module, layer structures in the liquid crystal display panel 03 are made of transparent material(s). For example, the first base substrate 310 and the second base substrate 320 are glass substrates, the pixel electrode 302 and the common electrode 301 are made of a transparent electrically conductive material. In addition, the above-described functional monomers B are generally selected from a polymerizable small-molecule material. However, the present disclosure is not limited thereto.

Next, a specific display principle of the above-described liquid crystal layer 300 including the liquid crystal molecules A and the functional monomers B during displaying will be further described.

Figure 10:
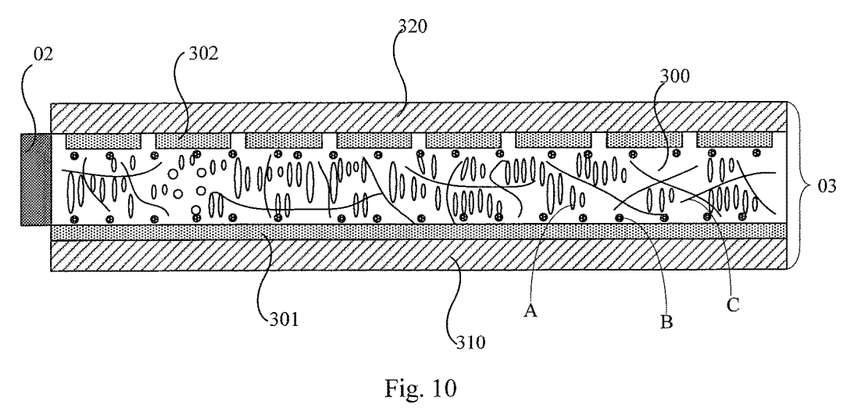
FIG. 10 is a schematic view of the display module shown in FIG. 9 in the case that an electric field is applied.

As shown in FIG. 9, the liquid crystal layer 300 of the above-described transparent liquid crystal display panel 03 serves as an optical waveguide layer. When the pixel electrode 302 and the common electrode 301 are not applied with a voltage, light emitted from the light bar 02 on the side surface of the liquid crystal layer 300 are totally reflected in the liquid crystal layer 300, and the light in the liquid crystal layer 300 cannot be outputted from the transparent liquid crystal display panel 03; when a voltage is applied to the pixel electrode 302 and the common electrode 301, as shown in FIG. 10, the functional monomers B undergoes a polymerization reaction, thereby total reflection of light in the liquid crystal layer 300 no longer exists, and the light can be emitted from the liquid crystal layer 300. As a result, the degree of crosslinking of the functional monomers B may be controlled by adjustment of intensity of the electric field between the pixel electrode 302 and the common electrode 301, such that light reflection state in the liquid crystal layer 300 can be adjusted, and therefore control of light output ratio of the liquid crystal layer 300 can be achieved.

Specifically, the fact that the degree of crosslinking of the functional monomers B can be varied under the driving of the pixel electrode 302 and the common electrode 301 and the light output ratio of the liquid crystal layer 300 varies with the degree of crosslinking of the functional monomers B will be further described below.

Under the effect of an electric field formed between the pixel electrode 302 and the common electrode 301, a phase separation is generated in the functional monomers B and polymerization reaction occurs, and a solid polymer network C is formed, the polymer network C can provide an anchoring effect on the liquid crystal molecules A in the liquid crystal layer. The polymer network C does not deflect or move under the effect of an electric field, but the degree of crosslinking of the polymer network C varies with the intensity of the electric field, i.e., a value of pitch (i.e., size of mesh) of the network of the polymer network structure varies, thus different anchoring forces are applied to the liquid crystal molecules A in the liquid crystal layer 300, thereby deflection degrees and directions of the liquid crystal molecules A are different (an effective refractive index of the liquid crystal layer is different). As a result, the liquid crystal layer 300 has different light output ratios.

In an embodiment of the display device, the liquid crystal layer 300 is divided into a plurality of small and separated liquid crystal sub-regions by the pixel electrodes 302. In this way, intensity of electric field in each liquid crystal sub-region may be controlled by adjusting a driving signal on the pixel electrode 302 and the common electrode 301, such that a value of the pitch of the network of the polymer network C in each liquid crystal sub-region can be controlled, and thereby deflection degree and direction of the liquid crystal molecules A are controlled. Thus, the light output ratio is controlled by controlling effective refractive index of each liquid crystal sub-region, i.e., different gray scale controls are achieved.

In addition, it should be noted that the above-described transparent display module is only an optional technical solution of the present disclosure, the present disclosure is not limited thereto. Any modified products based on the concept of the present disclosure, for example, a non-transparent display module manufactured based on the present disclosure or a display module in which a color film layer is additionally provided at a light exit side of the liquid crystal layer 300 to realize a normal color display, shall fall within the scope of the present disclosure.

As described above, the scope of the present disclosure is not limited to the specific embodiments of the present disclosure. Any modifications or replacements that are obvious to those skilled in the art on the basis of the disclosure shall fall within the scope of the present disclosure. Therefore, the scope of the present disclosure is defined by the appending claims.

What is claimed is:

1. A light emitting assembly, comprising a light emitting body and a reflector provided at a side of the light emitting body,
wherein the light emitting body is configured to emit first light and second light, the reflector comprises a reflective surface for reflecting the first light emitted by the light emitting body to form a reflected light beam, the reflected light beam compensating the second light emitted by the light emitting body,
wherein a direction of the first light is deviated from a direction of the second light, and each of the first light and the second light has a non-zero angle range, and
wherein the light emitting assembly further comprises a lens located on at least one side of the light emitting body and located in a path of the reflected light beam.

2. The light emitting assembly according to claim 1, wherein the reflected light beam is projected into an irradiation range of the second light.

3. The light emitting assembly according to claim 2, wherein the light emitting body comprises two LEDs disposed opposite to each other, and the first light and the second light are emitted by the two LEDs, respectively.

4. The light emitting assembly according to claim 1, wherein the reflective surface of the reflector is concave.

5. The light emitting assembly according to claim 4, wherein the light emitting body comprises two LEDs disposed opposite to each other, and the first light and the second light are emitted by the two LEDs, respectively.

6. The light emitting assembly according to claim 1, wherein the reflective surface of the reflector is convex.

7. The light emitting assembly according to claim 1, wherein the angle range of the reflected light beam is 80°.

8. The light emitting assembly according to claim 1, wherein the light emitting body comprises two LEDs disposed opposite to each other, and the first light and the second light are emitted by the two LEDs, respectively.

9. The light emitting assembly according to claim 1, wherein the angle range of the reflected light beam is smaller than the angle range of the second light.

10. The light emitting assembly according to claim 9, wherein the light emitting body comprises two LEDs disposed opposite to each other, and the first light and the second light are emitted by the two LEDs, respectively.

11. The light emitting assembly according to claim 1, wherein the angle range of the reflected light beam is larger than the angle range of the second light.

12. The light emitting assembly according to claim 1, wherein the reflector is detachably connected to the light emitting body.

13. A light bar, comprising a bracket and a plurality of light emitting assemblies according to claim 1, wherein the plurality of light emitting assemblies are uniformly mounted on the bracket.

14. A transparent display module, comprising a transparent liquid crystal display panel and the light bar according to claim 13, wherein the light bar is arranged on a side surface of the transparent liquid crystal display panel.

15. The transparent display module according to claim 14, wherein a liquid crystal layer of the transparent liquid crystal display panel comprises liquid crystal molecules and functional monomers, and the functional monomers form a polymer network having variable degree of crosslinking under the driving of an electric field, and a light output ratio of the liquid crystal layer varies with the degree of crosslinking of the polymer network.

16. A backlight module, comprising the light bar according to claim 13 and a light guide plate, wherein the light bar is located on a side surface of the light guide plate.

17. The backlight module according to claim 16, wherein the light guide plate is a liquid crystal panel.

18. A display module, comprising the backlight module according to claim 16.

* * * * *